United States Patent
Myung et al.

(10) Patent No.: US 10,218,821 B2
(45) Date of Patent: Feb. 26, 2019

(54) APPARATUS AND METHOD OF TRANSMITTING AND RECEIVING PACKET IN A BROADCASTING AND COMMUNICATION SYSTEM

(71) Applicant: Samsung Electronics Co. Ltd., Suwon-si, Gyeonggi-do (KR)

(72) Inventors: Seho Myung, Seoul (KR); Sung-Hee Hwang, Suwon-si (KR); Hyun-Koo Yang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 553 days.

(21) Appl. No.: 13/888,663

(22) Filed: May 7, 2013

(65) Prior Publication Data

US 2013/0294447 A1    Nov. 7, 2013

(30) Foreign Application Priority Data

May 7, 2012    (KR) .................. 10-2012-0048269
May 11, 2012   (KR) .................. 10-2012-0050291

(51) Int. Cl.
| | |
|---|---|
| H04L 29/06 | (2006.01) |
| H04L 29/14 | (2006.01) |
| H04L 1/00  | (2006.01) |

(52) U.S. Cl.
CPC ............ H04L 69/22 (2013.01); H04L 1/0008 (2013.01); H04L 1/0041 (2013.01);
(Continued)

(58) Field of Classification Search
None
See application file for complete search history.

(56) References Cited

U.S. PATENT DOCUMENTS

2003/0207696 A1\* 11/2003 Willenegger ......... H04W 52/40
455/522
2005/0013274 A1\* 1/2005 Pekonen ............... H03M 13/09
370/329

(Continued)

FOREIGN PATENT DOCUMENTS

| CN | 1751466 A | 3/2006 |
|---|---|---|
| CN | 1757191 A | 4/2006 |

(Continued)

OTHER PUBLICATIONS

Luby et al., Raptor Forward Error Correction Scheme for Object Delivery, Oct. 2007, Network Working Group, Request ofr Comments 5053, pp. 1-92.\*

(Continued)

Primary Examiner — Nicholas Sloms
(74) Attorney, Agent, or Firm — Jefferson IP Law, LLP

(57) ABSTRACT

A method and apparatus of transmitting/receiving a packet in a system are provided. The method includes dividing each symbol corresponding to each row of a two-dimensional array having a predetermined symbol size (T) as a width into a predetermined number (m) of regions, sequentially arranging source packets to be transmitted, starting from a first column of a first row of the two-dimensional array, setting a remaining part of a region in which last data of a source packet is allocated in a last row in which the source packet is arranged to a predetermined value, arranging a next source packet, starting from a starting point of a region next to the region in which the last data is allocated in the last row in which the source packet is arranged, constructing a source block by arranging all of the source packets in the two-dimensional array, FEC-encoding the source block, and transmitting the FEC-encoded source block.

2 Claims, 8 Drawing Sheets

(52) U.S. Cl.
CPC ........ *H04L 1/0071* (2013.01); *H04L 65/4076* (2013.01); *H04L 65/607* (2013.01); *H04L 69/40* (2013.01)

(56) References Cited

U.S. PATENT DOCUMENTS

| | | |
|---|---|---|
| 2005/0193309 A1 | 9/2005 | Grilli et al. |
| 2005/0257106 A1* | 11/2005 | Luby .................... H03M 13/29 |
| | | 714/710 |
| 2006/0280254 A1 | 12/2006 | Luby et al. |
| 2007/0147384 A1 | 6/2007 | Pekonen et al. |
| 2008/0028275 A1* | 1/2008 | Chen ................... G06F 11/1008 |
| | | 714/752 |
| 2008/0256418 A1 | 10/2008 | Luby et al. |
| 2009/0177942 A1* | 7/2009 | Hannuksela .......... H04L 1/0084 |
| | | 714/752 |
| 2009/0327842 A1 | 12/2009 | Liu et al. |
| 2010/0050057 A1* | 2/2010 | Luby .................... H04L 1/0041 |
| | | 714/776 |
| 2011/0299629 A1* | 12/2011 | Luby ................ H03M 13/3761 |
| | | 375/299 |
| 2013/0254611 A1* | 9/2013 | Amerga ............... H04N 19/895 |
| | | 714/746 |

FOREIGN PATENT DOCUMENTS

| | | |
|---|---|---|
| CN | 101540610 A | 9/2009 |
| JP | 2009-105962 A | 5/2009 |
| KR | 10-2006-0120604 A | 11/2006 |
| WO | 00/72493 A | 11/2000 |
| WO | 2004/079982 A1 | 9/2004 |
| WO | 2011/082834 A1 | 7/2011 |

OTHER PUBLICATIONS

M. Luby, RaptorQ Forward Error Correction Scheme for Object Delivery, Aug. 2011, Internet Engineering Task Force (IETF), RFC 6330, pp. 1-70. (Year: 2011).*

Samsung Electronics Co., Ltd.; Proposed Evaluation Procedure for Source Block Construction; 3GPP TSG SA4 #68 meeting; TdocS4 (12)0366; Apr. 16-20, 2012; Kyoto, Japan, pp. 1-6.

Korean Office Action dated Oct. 23, 2018, issued in the Korean Application No. 10-2012-0050291.

* cited by examiner

| 401 | 402 | 403 |
|---|---|---|
| Source Block Number (SBN) | Encoding Symbol ID (ESI) | Packet Start Position (PSP) |

- Source Block Number (SBN) : An integer identifier for the source block that the source data within the packet relates to.
- Encoding Symbol ID (ESI) : The starting symbol index of the source packet in the source block.
- Packet Start Position (PSP) : The starting region index of the source packet in the source block.

| 404 | 405 | 406 |
|---|---|---|
| Source Block Number (SBN) | Encoding Symbol ID (ESI) | Source Block Length (SBL) |

- Source Block Number (SBN) : An integer identifier for the source block that the repair symbols within the packet relates to.
- Encoding Symbol ID (ESI) : An integer indentifier for the encoding symbols within the packet.
- Source Block Length (SBL) : The number of source symbols in the source block

FIG.4

| 501 | 502 |
|---|---|
| Source Block Number (SBN) | Subdivided Encoding Symbol ID (SESI) |

- Source Block Number (SBN) : An integer identifier for the source block that the source data within the packet relates to.
- Subdivided Encoding Symbol ID (SESI) : The starting subdivided-symbol index of the source packet in the source block.

FIG.5

| 404 | 405 | 406 | 407 |
|---|---|---|---|
| Source Block Number (SBN) | Encoding Symbol ID (ESI) | Source Block Length (SBL) | Number of Regions (NOR) |

- Number of Regions (NOR) : The number of regions in the source block

FIG.6

| 701 | 702 | 703 | 704 |
|---|---|---|---|
| Source Block Number (SBN) | Encoding Symbol ID (ESI) | Number of Regions (NOR) | Packet Start Position (PSP) |

FIG.7

| 801 | 802 | 803 |
|---|---|---|
| Source Block Number (SBN) | Number of Regions (NOR) | Subdivided Encoding Symbol ID (SESI) |

FIG.8

| 1001 | 1002 | 1003 |
|---|---|---|
| Symbol Size (T) | Number of Subdivided Symbols (m) (NSS) | Maximum Source Block Length |

- Symbol Size (T) : The size of an encoding symbol, in bytes.
- Number of Subdivided Symbols (NSS) (m) : The number of subdivided symbols for an encoding symbol.
- Maximum Source Block Length : The maximum length of a source block, in symbols.

FIG.10A

| 1001 | 1004 | 1003 |
|---|---|---|
| Symbol Size (T) | Number of Regions (m) (NOR) | Maximum Source Block Length |

- Symbol Size (T) : The size of an encoding symbol, in bytes.
- Number of Regions (NOR) : The number of regions in the source block.
- Maximum Source Block Length : The maximum length of a source block, in symbols.

FIG.10B

FEC OBJECT TRANSMISSION INFORMATION

| 1001 | 1002 | 1003 |
|---|---|---|
| Symbol Size (T) | Number of Subdivided Symbols (m) (NSS) | Maximum Source Block Length |

SOURCE PACKET ADDITIONAL INFORMATION

| 501 | 502 |
|---|---|
| Source Block Number (SBN) | Subdivided Encoding Symbol ID (SESI) |

REPAIR PACKET ADDITIONAL INFORMATION

| 404 | 405 | 406 |
|---|---|---|
| Source Block Number (SBN) | Encoding Symbol ID (ESI) | Source Block Length (SBL) |

FIG.11

FEC OBJECT TRANSMISSION INFORMATION

| Symbol Size (T) 1001 | Number of Regions (m) (NOR) 1004 | Maximum Source Block Length 1003 |
|---|---|---|

SOURCE PACKET ADDITIONAL INFORMATION

| Source Block Number (SBN) 401 | Encoding Symbol ID (ESI) 402 | Packet Start Position (PSP) 403 |
|---|---|---|

REPAIR PACKET ADDITIONAL INFORMATION

| Source Block Number (SBN) 404 | Encoding Symbol ID (ESI) 405 | Source Block Length (SBL) 406 |
|---|---|---|

FIG.12

| Subdivided Symbol Size ($T_{sub}$) 1301 | Number of Subdivided Symbols (m) (NSS) 1002 | Maximum Source Block Length 1003 |
|---|---|---|

· Subdivided Symbol Size ($T_{sub}$) : The size of a subdivided symbol, in bytes.
· Number of Subdivided Symbols (NSS) (m) : The number of subdivided symbols for an encoding symbol.
· Maximum Source Block Length : The maximum length of a source block, in symbols.

FIG.13A

| Subdivided Symbol Size ($T_{sub}$) 1301 | Number of Regions (m) (NOR) 1004 | Maximum Source Block Length 1003 |
|---|---|---|

FIG.13B

APPARATUS AND METHOD OF TRANSMITTING AND RECEIVING PACKET IN A BROADCASTING AND COMMUNICATION SYSTEM

PRIORITY

This application claims the benefit under 35 U.S.C. § 119(a) of a Korean patent application filed on May 7, 2012 in the Korean Intellectual Property Office and assigned Serial No. 10-2012-0048269 and a Korean patent application filed on May 11, 2012 in the Korean Intellectual Property Office and assigned Serial No. 10-2012-0050291, the entire disclosures of each of which is hereby incorporated by reference.

BACKGROUND OF THE INVENTION

1. Field of the Invention

The present invention relates to data transmission and reception in a broadcasting or communication system. More particularly, the present invention relates to an apparatus and method of efficiently recovering data, when data loss occurs on a channel or in a network.

2. Description of the Related Art

In the recent broadcasting and communication environment, data congestion in a network has become serious due to the diversification of multimedia content and the increase of large-size content such as High Definition (HD) content or Ultra High Definition (UHD) content. As a result, content transmitted by a transmitter (e.g. host A) is not received normally at a receiver (e.g. host B) due to loss of a part of the content in a route. Since data is transmitted in packets in many cases, data loss also occurs in packets. As the receiver does not receive a data packet due to data loss over a network, the receiver does not acquire the data of the lost packet. Therefore, various inconveniences may result, including the degradation of audio quality or video quality, display of defective images, omissions of text, and file damage. Accordingly, there exists a need for a technique of recovering data lost during transmission over a network.

One method of supporting recovery in a receiver of data that has been lost during transmission over a network, is to construct a source block with a predetermined number of data packets each having a variable length, called source packets and add repair information such as parity data or repair packets to the source block by Forward Error Correction (FEC) coding. In the presence of lost data, the receiver may decode the data using the repair information.

Each of the source packets to which the repair information is added may not have an intended length and thus may be zero-padded. This means that the conventionally constructed source block may include a large amount of zero padding according to packet lengths. Although zero-padded data is meaningless data not transmitted by the transmitter, the zero-padded data increases the number of symbols in the source block and is involved in generating parity data. Therefore, the zero-padded data causes generation and transmission of parity data for unnecessary information.

The amount of zero padding may be reduced relatively by decreasing an intended length of source packets. However, due to the resulting significant increase in the number of symbols in the source block, a very long FEC code is required. Because an FEC code length available to a system is limited and a longer FEC code increases the complexity of Maximum log-Likelihood (ML) decoding, decoding latency may be lengthened.

Accordingly, there exists a need for a method of constructing a source block more efficiently to reduce the number of code symbols and improve error correction capability by reducing zero-padded data.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of transmitting and receiving packet data in a broadcasting or communication system.

Another aspect of the present invention is to provide a method and apparatus of recovering data efficiently, when data loss occurs in a broadcasting or communication system.

Another aspect of the present invention is to provide an apparatus and method of constructing a source block more efficiently to reduce the amount of zero-padded data and improve error correction capability in a broadcasting or communication system.

In accordance with an aspect of the present invention, a method of transmitting a packet in a broadcasting and communication system is provided. The method includes dividing each symbol corresponding to each row of a two-dimensional array having a predetermined symbol size (T) as a width into a predetermined number (m) of regions, sequentially arranging source packets to be transmitted within the symbol size T in the two-dimensional array, starting from a first column of a first row of the two-dimensional array, setting a remaining part of a region in which last data of a source packet is allocated in a last row in which the source packet is arranged to a predetermined value, arranging a next source packet, starting from a starting point of a region next to the region in which the last data is allocated in the last row in which the source packet is arranged, after the source packet is arranged, constructing a source block by arranging all of the source packets in the two-dimensional array, Forward Error Correction (FEC)-encoding the source block, and transmitting the FEC-encoded source block.

In accordance with another aspect of the present invention, an apparatus of transmitting a packet in a broadcasting and communication system is provided. The apparatus includes a source block constructer configured to divide each symbol corresponding to each row of a two-dimensional array having a predetermined symbol size (T) as a width into a predetermined number (m) of regions, to sequentially arrange source packets to be transmitted within the symbol size T in the two-dimensional array, starting from a first column of a first row of the two-dimensional array, to set a remaining part of a region in which last data of a source packet is allocated in a last row in which the source packet is arranged to a predetermined value, to arrange a next source packet, starting from a starting point of a region next to the region in which the last data is allocated in the last row in which the source packet is arranged, after the source packet is arranged, and to construct a source block by arranging all of the source packets in the two-dimensional array, and an FEC encoder configured to encode the source block and to transmit the FEC-encoded source block.

In accordance with another aspect of the present invention, a method of receiving a packet in a broadcasting and communication system is provided. The method includes interpreting data received in a source block and FEC-decoding the source block. The source block is constructed by dividing each symbol corresponding to each row of a two-dimensional array having a predetermined symbol size (T) as a width into a predetermined number (m) of regions, sequentially arranging source packets to be transmitted within the symbol size T in the two-dimensional array, starting from a first column of a first row of the two-dimensional array, setting a remaining part of a region in which last data of a source packet is allocated in a last row in which the source packet is arranged to a predetermined value, arranging a next source packet, starting from a starting point of a region next to the region in which the last data is allocated in the last row in which the source packet is arranged, after the source packet is arranged, and arranging all of the source packets in the two-dimensional array so as to construct the source block.

In accordance with another aspect of the present invention, an apparatus of receiving a packet in a broadcasting and communication system is provided. The apparatus includes a source block interpreter configured to interpret data received in a source block, and an FEC decoder configured to FEC-decode the source block. The source block is constructed by dividing each symbol corresponding to each row of a two-dimensional array having a predetermined symbol size (T) as a width into a predetermined number (m) of regions, sequentially arranging source packets to be transmitted within the symbol size T in the two-dimensional array, starting from a first column of a first row of the two-dimensional array, setting a remaining part of a region in which last data of a source packet is allocated in a last row in which the source packet is arranged to a predetermined value, arranging a next source packet, starting from a starting point of a region next to the region in which the last data is allocated in the last row in which the source packet is arranged, after the source packet is arranged, and arranging all of the source packets in the two-dimensional array so as to construct the source block.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates signaling information added to a source packet and a repair packet according to an exemplary embodiment of the present invention;

FIG. 5 illustrates signaling information added to a source packet according to an exemplary embodiment of the present invention;

FIG. 6 illustrates signaling information added to a repair packet according to an exemplary embodiment of the present invention;

FIG. 7 illustrates signaling information added to a source packet according to an exemplary embodiment of the present invention;

FIG. 8 illustrates signaling information added to a source packet according to an exemplary embodiment of the present invention;

FIGS. 10A and 10B illustrate Forward Error Correction (FEC) Object Transmission Information (OTI) according to exemplary embodiments of the present invention;

FIG. 11 illustrates a set of signaling information according to an exemplary embodiment of the present invention;

FIG. 12 illustrates a set of signaling information according to an exemplary embodiment of the present invention; and FIGS. 13A and 13B illustrate FEC OTI according to exemplary embodiments of the present invention.

Throughout the drawings, like reference numerals will be understood to refer to like parts, components, and structures.

DETAILED DESCRIPTION OF EXEMPLARY EMBODIMENTS

Figure 1:
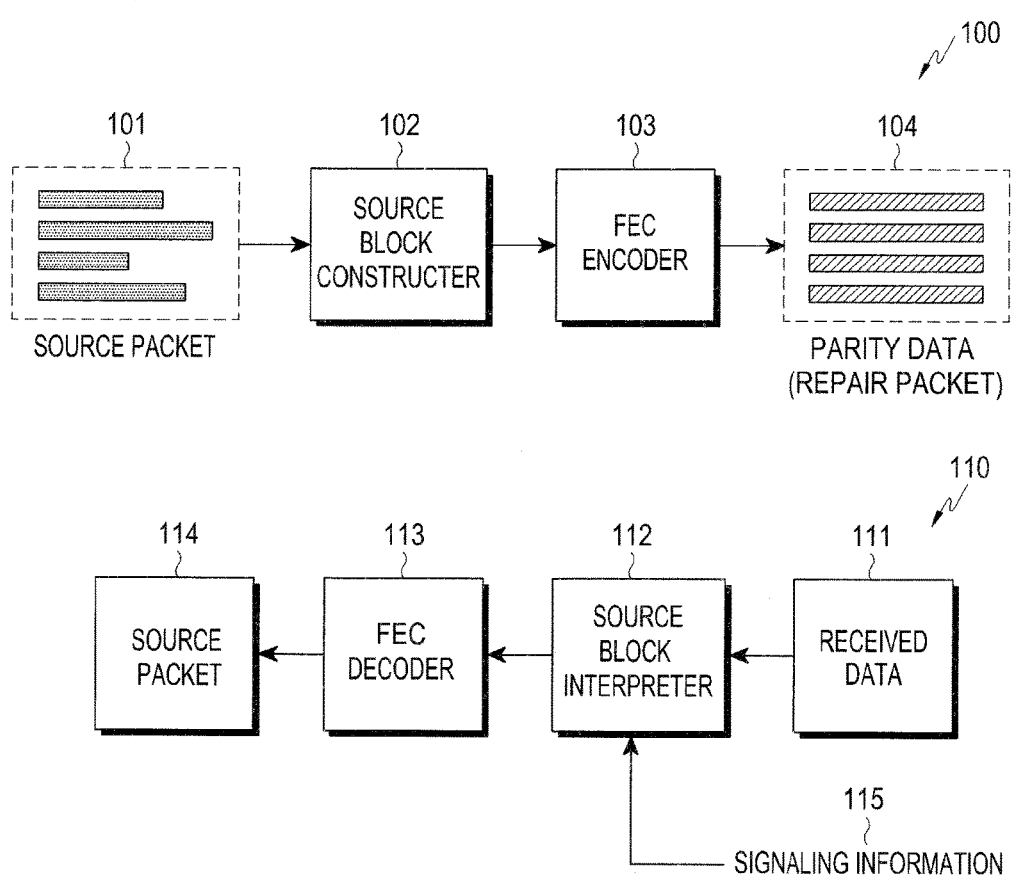
FIG. 1 is a block diagram of a transmitter and a receiver according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

Exemplary embodiments of the present invention provide a method of efficiently recovering lost data in an electronic device, such as a portable phone, a TV, a computer, an electronic blackboard, a tablet, and an e-book reader, which can transmit and receive large-size content including High Definition (HD) content or Ultra High Definition (UHD) content and various multimedia services including a video conference/call. Exemplary embodiments of the present invention provide a method of improving decoding performance or increasing transmission efficiency by efficiently constructing a source block, when Forward Error Correction (FEC) coding is applied to data packets. While a specific FEC coding scheme is not specifically mentioned herein, it is to be understood that the present invention is applicable to, not limited to, a Reed-Solomon (RS) code, a Low Density Parity Check (LDPC) code, a turbo code, a Raptor code, a Raptor Q code, XOR (a single parity-check code), a pro-Moving Picture Experts Group (MPEG) FEC code, and the like.

FIG. 1 is a block diagram of a transmitter and a receiver according to an exemplary embodiment of the present invention.

Referring to FIG. 1, a transmitter 100 includes a source block constructor 102 and an FEC encoder 103. The source block constructor 102 constructs a source block with a predetermined number of data packets each having a variable length, called source packets 101. The FEC encoder 103 adds repair information 104 such as parity data or repair packets to the source block by FEC-encoding the source block and transmits the source block.

A receiver 110 includes a source block interpreter 112 and an FEC decoder 113. The source block interpreter 112 divides data 111 received in a source block into source symbols to which a repair block has been added. The FEC decoder 113 recovers source packets 114 by FEC-decoding the source symbols. The source block interpreter 112 recovers lost data using signaling information 115 received together with or separately from the data 111.

Figure 2:
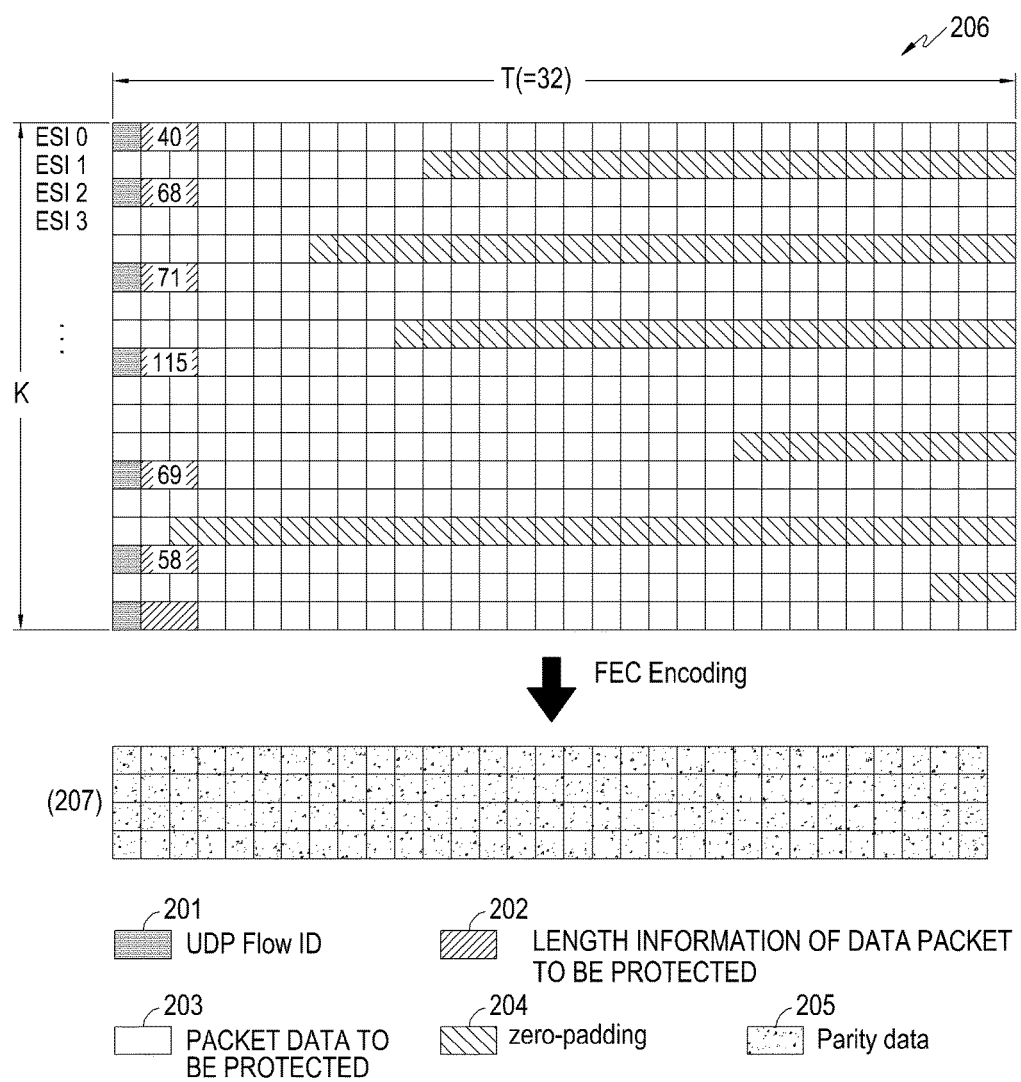
FIG. 2 illustrates a configuration of a general source block according to an exemplary embodiment of the present invention.

FIG. 2 illustrates a configuration of a general source block according to an exemplary embodiment of the present invention.

Referring to FIG. 2, given source packets are sequentially arranged in a two-dimensional array having a predetermined width T. Each row of the array is a symbol and T is a symbol size. The symbol size is generally expressed in bytes or bits. FEC is generally applied on a symbol basis.

The source block constructer 102 adds a flow Identifier (ID) 201 and packet length information 202 to each source packet 203 and sequentially arranges the source packets 203, starting from the first column of the first row in the array within the symbol size T. Unless otherwise specified, the packet length information is expressed usually in bytes.

All of the source packets 203 added with the additional information 201 and 202 are sequentially arranged row by row in the array, starting from the first column of the first row. If the length of a source packet having additional information 201 and 202 is not a multiple of the symbol size T, the remaining part of the last row having the source packet is padded with zeros, as indicated by zero-padding 204. When the given source packets 203 are completely arranged in the above manner, the resulting array having K rows is called a source block 206.

The K rows of the source block 206 may be regarded as K source symbols to be FEC-encoded. Repair symbols (e.g., parity symbols) 205 or 207 are generated by FEC-encoding the K source symbols. The source symbols and the repair symbols are collectively called code symbols.

If a source block is constructed in this manner, the length of zero-padding may be increased. Therefore, exemplary embodiments of the present invention provide a method of efficiently constructing a source block to improve error correction capability, while reducing the amount of zero-padding data.

Figure 3A:
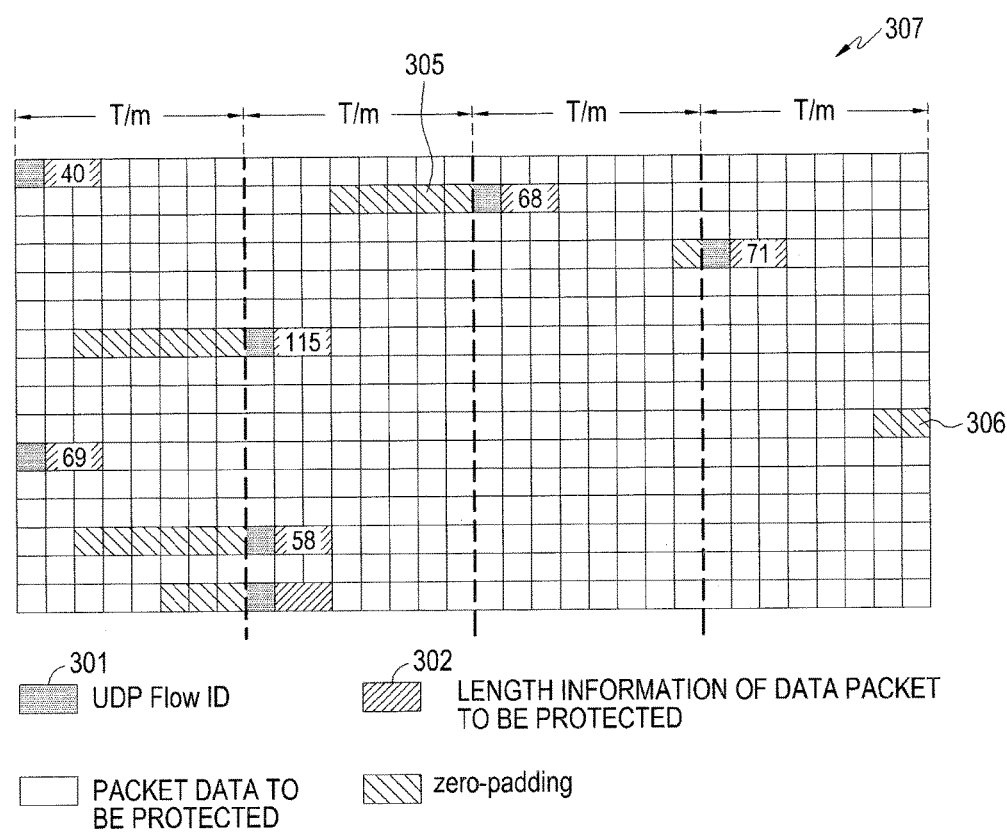
FIGS. 3A and 3B illustrate configurations of source blocks according to exemplary embodiments of the present invention.
Figure 3B:
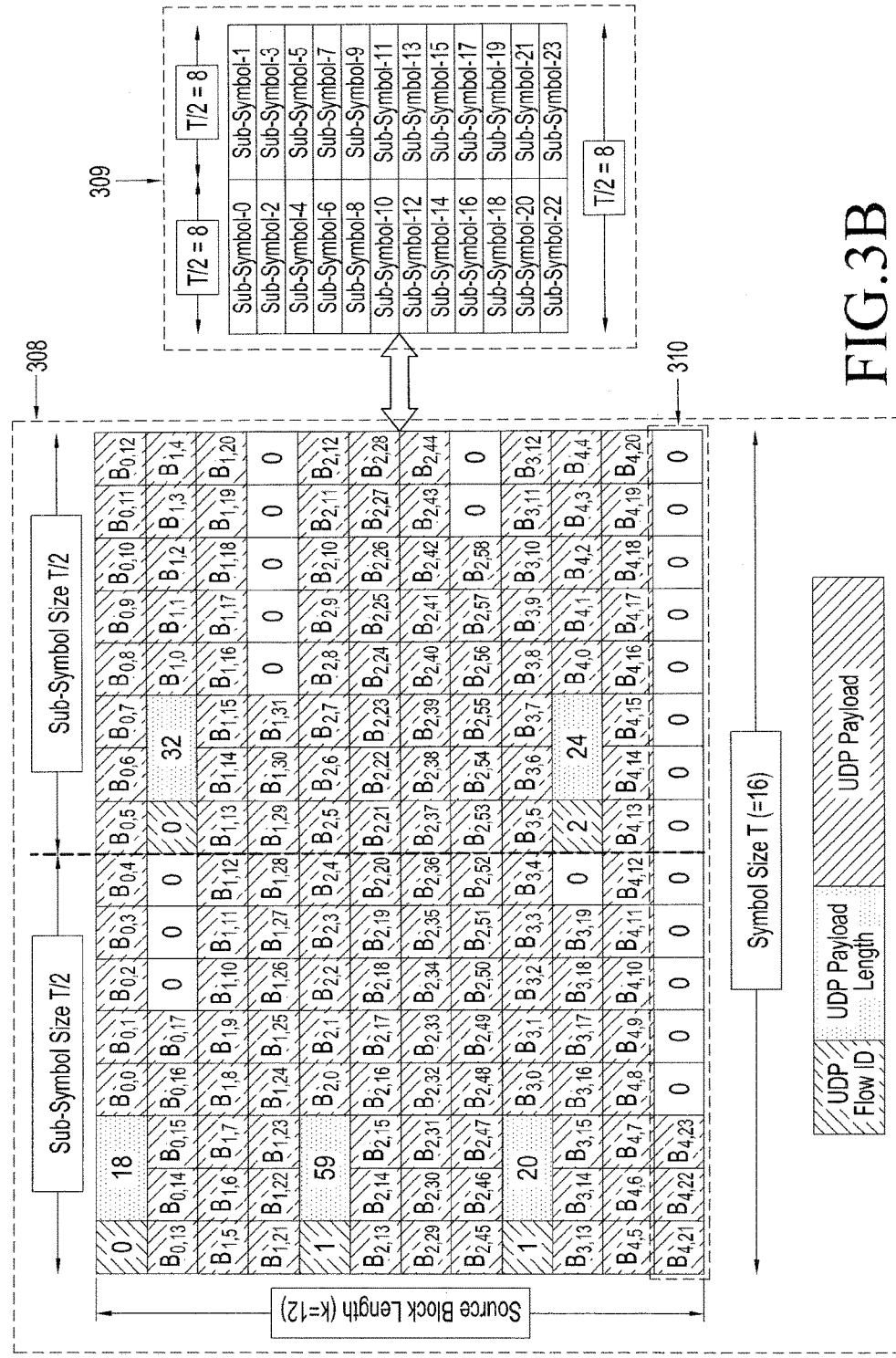

FIGS. 3A and 3B illustrate configurations of source blocks according to exemplary embodiments of the present invention.

Referring to FIG. 3A, the source block constructer 102 divides the columns of a two-dimensional array having a symbol size T into m regions on a symbol basis. In the example shown in FIG. 3A, m=4. If T is not a multiple of m, the m regions include regions each having [T/m]+1 columns and regions each having [T/m] columns. [A] represents the largest integer equal to or smaller than any real number A. The regions each having [T/m]+1 columns and the regions each having [T/m] columns may be predefined between the transmitter 100 and the receiver 110 according to a predetermined rule or may be indicated by the number of columns in each region. The predetermined rule may be that if the remainder of dividing T by m is n (n<m), each of the first n regions has [T/m]+1 columns and each of the remaining (m−1) regions has [T/m] columns. Besides the regular division of regions, the number of columns in each region may be set differently according to mutual agreement between the transmitter 100 and the receiver 110.

When needed, feature information 301 such as a flow ID (e.g. a User Datagram Protocol (UDP) flow ID) and packet length information 302 are added to each source packet. Source packets having the information 301 and 302 are sequentially arranged within the symbol size T, starting from the first column of the first row in the array.

The remaining part of a region to which the last data of a source packet added with additional information is allocated in the last row in which the source packet is arranged, is filled with predetermined values. The predetermined value may be, but is not limited to, 0. For example, in FIG. 3A the last data of the first packet is allocated to the second of four regions and thus the remaining part 305 of the second region is filled with 0s.

After one source packet having additional information is arranged, the next source packet starts from the starting point of the region following the region having the last data of the previous source packet in the last row having the previous source packet. In other words, every source packet should start from the starting point of a region. For example, the second source packet starts from the starting point of the third region following the zero-padded data 305. If zero-padded data is allocated to the last region like zero-padded data 306 of the fourth source packet, the fifth source packet starts from the first region in the next row.

When all of the given source packets are arranged in the above manner, the resulting array 307 is a source block.

FIG. 3B illustrates a source block 308 constructed with five User Datagram Protocol (UDP) packets having lengths 18, 32, 59, 20 and 24, respectively, when T=16 and m=2 according to an exemplary embodiment of the present invention. The first two packets are generated from UDP flow 0, the third and fourth packets are generated from UDP flow 1, and the fifth packet is generated from UDP flow 2. As illustrated in FIG. 3B, a source block is constructed by adding a UDP flow ID and UDP packet length information to each source packet. Each entry Bi,j in the source block is byte data, indicating a (j+1)th byte of an (i+1)th UDP packet.

Each row of the source block 308 corresponds to one source symbol. If each source symbol is sub-divided by T/m according to the divided regions and each of the sub-divided fragments is defined as a sub-symbol (sub-divided symbol) or symbol element, each source symbol includes two length-8 sub-symbols in the source block 308, as indicated by reference numeral 309. Therefore, the source block 308 includes 12 source symbols, namely 24 sub-symbols 309.

A description of the structure of the last row (or the last source symbol) of a source block according to an exemplary embodiment of the present invention is described below.

When a source block is constructed with source packets, the length K of the source block may be limited due to a limit on processing time or memory capacity in a system. For example, if the maximum allowed length of a source block is Kmax, it is clear that the maximum size of data included in one source block is T×Kmax. However, since zero-padding may be generated during arranging source packets, the actual data of the source block may be smaller than T×Kmax bytes.

If a source block requires more source symbols than the maximum allowed source block length Kmax due to addition of a specific packet input to the source block constructer, the input packet is excluded from the source block. Specifically, a source block that does not exceed the maximum data capacity T×Kmax is constructed by sequentially allocating source packets within the maximum data size.

In this case, a part of the last packet of the source block is always located in the last row (or the last source symbol) of the source block. Predetermined values are always allocated (or set) in the remaining part of the last row (or the last source symbol) after the last packet is allocated, irrespective of the region division. For example, if the fifth source packet is the last packet of the source block 308, a part of the data of the last packet is located in the first region (or the first sub-symbol) of the last 12th row (or source symbol) in FIG. 3B. The last second region (or the second sub-symbol) as well as the remaining part of the first region (or the first sub-symbol) is all filled with 0s, as shown by zero-padding 310.

The structure of the last row (or source symbol) of a source block according to another exemplary embodiment of the present invention is described below.

Various constraints may be imposed on the structure of the last row (or the last source symbol) of a source block depending on system setting conditions. For example, it may be specified that only a part of the data of one source packet is always allocated to the last row (or source symbol) of a source block. In other words, partial data of two or more packets are not allocated simultaneously to the last row (or source symbol) of the source block.

An exemplary operation of constructing a source block under the constraint is described below. If the maximum allowed length of a source block is Kmax and the constraint that only a part of the data of one source packet is always allocated to the last row (or source symbol) of the source block is imposed, the source block is constructed as follows.

If addition of a specific source packet results in a source block requiring more source symbols than Kmax, the source block constructer constructs a source block only with previously received source packets except for the last received source packet. For the convenience of description, the last received source packet is denoted by Packet-0 and the previous source packets are denoted sequentially by Packet-1, Packet-2, . . . in reverse order.

The source block constructer determines whether partial data of two or more source packets among source packets received before Packet-0 are allocated simultaneously to the last row (or source symbol) of the source block. If only the data of the last source packet Packet-1 is allocated to the last row (or source symbol) of the source block, the source block constructer determines the source block as a final source block.

In contrast, if partial data of two or more source packets are included in the last row (or source symbol), one or more source packets are removed from the source block in reverse order of input to the source block constructer until only partial data of one source packet is included in the last row (or source symbol). For example, if partial data of Packet-1 and Packet-2 is included in the last row (or source symbol) of the source block, Packet-1 is removed from the source block. In another example, if partial data of Packet-1, Packet-2, and packet-3 is included in the last row (or source symbol) of the source block, Packet-1 and Packet-2 are removed from the source block. Once source packets are appropriately arranged in the manner satisfying the given constraint, the resulting source block is determined as a final source block.

According to another exemplary embodiment of the structure of the last row (or source symbol) of a source block, a recommended reference value for a source block length is set to Kb. In this case, a preferred data size for one source block is T×Kb bytes. However, since zero-padding may occur during arranging source packets, the actual data of the source block may be smaller than T×Kb bytes.

If a source block requires source symbols more than the source block length Kb due to input of a specific packet, the input packet becomes the last packet of the source block. Specifically, when source packets are sequentially allocated to a source block, packets up to the first source packet whose addition makes the source block exceed the recommended data size Kb are used in constructing the source block. However, if the source block exceeds a system-set maximum memory size or buffer size due to addition of the last input packet, the last input packet is excluded from the source block.

In the above exemplary embodiment, although the number of source symbols (i.e., the source block length) may be a little larger than Kb, the constraint that only a part of the data of one source packet is allocated to the last row (or the last source symbol) of the source block may be satisfied, except the case where the last packet is too large and thus the source block exceeds the system-set maximum memory or buffer size due to addition of the last packet, thereby making it impossible to construct the source block.

A source block is constructed as follows according to the exemplary embodiment of the present invention.

The columns of a two-dimensional array with symbol size T are divided into m regions each having size T/m. If T is not a multiple of m, the m regions include regions each having [T/m]+1 columns and regions each having [T/m] columns. After additional information is added to source packets when needed, the source packets are sequentially arranged within the symbol size in the two-dimensional array. According to another exemplary embodiment, after m is determined, T may be defined as a multiple of m.

Each source packet should start from the first column of any of the m regions and predetermined values such as 0s are allocated to the remaining part of a region in which the last data of a source packet added with additional information is allocated in the last row in which the source packet is located.

While T/m or more zero-padding may be inserted between arranged source packets depending on system requirements, the maximum length of zero-padding is usually smaller than T/m in order to minimize the ratio of zero-padding. Therefore, after one source packet added with additional information is arranged, the next source packet may start from the starting point of a region following a region in which the last data of the source packet is allocated in the last row in which the source packet is arranged. If the last data of the source packet is allocated to the last mth region, the next source packet starts from the first region of the next row.

Compared to the source block configuration illustrated in FIG. 2, the source block configurations illustrated in FIGS. 3A and 3B may effectively reduce the amount of zero-padding. Particularly when the length of each source packet is variable, the amount of zero-padding may be reduced by 1/m on average by dividing a two-dimensional array into m regions. As a consequence, the number of FEC-encoded source symbols may be reduced.

It is assumed that given symbol size T, K1 source symbols are generated from source packets and Np repair symbols are generated by FEC-encoding the source symbols in a method according to the related art. It is also assumed that given symbol size T, K2 source symbols are generated from the same source packets and the same number of repair symbols, that is, Np repair symbols are generated by FEC-encoding the source symbols in the same manner. Since the same number of repair symbols are generated from the same number of source packets, the two cases have the same overhead. However, comparison between FEC code rates K1/(K1+Np) and K2/(K2+Np) leads to K1>K2. Accordingly, K1/(K1+Np)>K2/(K2+Np). It is known that a lower code rate has more robust protection performance for the same amount of parity information in the same FEC scheme.

Accordingly, exemplary embodiments of the present invention may provide better error correction performance than the method according to the related art, almost without additional overhead by efficiently reducing the amount of zero-padding.

In the source block configuration according to the related art, if one source packet is lost, all rows in which the source packet is arranged (i.e., all code symbols of the source packet) are regarded as lost. In contrast, since the columns or code symbols of a source block according to exemplary embodiments of the present invention are divided into m regions, lost parts and normal parts may be distinguished and thus the normal parts in the m regions may be used for decoding, thereby improving decoding performance according to exemplary embodiment of the present invention.

When FEC is applied to a source block configured according to exemplary embodiments of the present invention, the transmitter 100 should transmit information indicating the number of divided regions in a source block and information indicating the starting region of each source packet to the receiver 110. If the receiver 110 fails to acquire the information and a source packet is lost, the receiver 110 has difficulty in FEC-decoding the source packet because the receiver 110 does not know the position of the lost packet in the source block.

Signaling information about the symbol size T and the number m of divided regions may be transmitted, added to each source packet or in an additional packet. According to an exemplary embodiment of transmitting the signaling information in an additional packet, T and m may be transmitted together with FEC information by a Content Delivery Protocol (CDP) such as a Session Description Protocol (SDP). If T is not a multiple of m, the receiver 110 may determine the number of columns in each region based on T and m according to a predetermined rule (for example, each upper region includes [T/m]+1 columns and each of lower regions includes [T/m] columns).

According to another exemplary embodiment of the present invention, information indicating the starting row of each source packet (i.e., information indicating the order of code symbols and a starting region of the source packet in a starting code symbol of the source packet) may be added to the source packet and transmitted to the receiver 110 so that the receiver 110 may determine the layout of source packets in a source block.

FIG. 4 illustrates signaling information added to a source packet and a repair packet according to an exemplary embodiment of the present invention.

Referring to FIG. 4, each of the source packet and the repair packet may include at least one of the following parameters. A Source Block Number (SBN) 401 identifies a source block that a source packet relates to, an Encoding Symbol ID (ESI) 402 indicates the starting code symbol of the source packet (i.e., the starting row of the source packet in the source block), and a Packet Start Position (PSP) 403 indicates the starting region of the source packet in the source block. The SBN 401 may include an information field indicating the ID of the starting source symbol of the source block and an information field indicating the number of source symbols in the source block.

For example, if m=4 as illustrated in FIG. 3A, the ESI and PSP of the first source packet may be (0, 0), the ESI and PSP of the second source packet may be (2, 2), the ESI and PSP of the third source packet may be (4, 3), and the ESI and PSP of the fourth source packet may be (7, 1).

An optional Source Block Length (SBL) 406 indicating the total number of rows in the source block may be transmitted so as to specify an accurate source block configuration. In addition, an ESI 405 may be added to a repair packet.

If a source block includes K source symbols, values 0, 1, 2, ... (K−1) are sequentially allocated as the ESIs 402 of the K source symbols, to thereby identify the source symbols of FEC source packets. The ESI 402 of each source symbol may be referred to as a source FEC payload ID in that the ESI 402 identifies the source symbol in an FEC source packet.

In an alternative embodiment, the ESI 405 of a repair packet may be allocated in various manners depending on system requirements. For example, values 0, 1, 2, ... may be sequentially allocated as the ESIs 405 of repair packets as done for the ESIs 402 of source packets. In this case, an octet size required to represent the ESI 405 of a repair packet may be minimized.

In another exemplary embodiment, indexes K, (K+1), (K+2), ... may be sequentially allocated as the ESIs 405 of repair symbols, considering the repair symbols as code symbols following the source symbols.

In another exemplary embodiment, if a source block is divided into m regions and each source symbol is regarded as m sub-symbols, the source block includes a total of m×k sub-symbols. Therefore, values m×k, (m×k+1), (m×k+2), ... may be sequentially allocated as the ESIs 405 of the repair symbols.

The sizes of the signaling fields 401 to 406 may depend on system requirements. In an exemplary embodiment, the SBN 401 may be 1 or 2 bytes, the ESI 402 may be 2 or 3 bytes, the PSP 403 may be 1 or 2 bytes, and the SBL 406 may be 2 or 3 bytes.

The receiver 110 acquires the SBN 401, the ESI 402, and the PSP 403 from each source packet. If one or more source packets are lost and thus require FEC decoding, the receiver 110 may receive at least one repair packet and acquire the SBL 406 from the repair packet. Once the receiver 110 acquires information about the number of regions in a transmitted source block from an additional packet, the receiver 110 may determine the full configuration of the source block corresponding to the SBN 401. Additionally, the receiver 110 may recover the lost source packets by acquiring the SBN 404 and the ESI 405 from each repair packet and FEC-decoding the source block corresponding to the SBN 404 using the SBN 404 and the ESI 405.

FIG. 5 illustrates signaling information added to a source packet according to an exemplary embodiment of the present invention.

Referring to FIG. 5, a Sub-divided Encoding Symbol ID (SESI) 502 may substitute for the ESI 402 and the PSP 403 illustrated in FIG. 4 by sub-dividing a code symbol according to each divided region, that is, sub-dividing the code symbol into a predetermined number of sub-symbols each having a predetermined length and allocating a symbol number to each region. The SESI 502 identifies a sub-symbol in an FEC source packet like the ESI 402, and the SESI 502 of each FEC source packet may be increased by the number of sub-symbols from the SESI 502 of the previous FEC source packet. If the number of divided regions is m, the number of sub-symbols are an m multiple of the total number of code symbols and the size of a sub-symbol is a 1/mth of a code symbol size on average. In an exemplary embodiment, the SESI 502 may be 2 to 4 bytes.

For example, if m=4 as illustrated in FIG. 3A, each code symbol is divided into four sub-symbols each having size T/4. Thus, the total number of sub-symbols is four times as large as the total number of code symbols. As illustrated in FIG. 3A, the SESIs of the first to fourth source packets may be represented as 0, 10, 19 and 29, respectively.

While SESI=m×ESI+PSP in the above exemplary embodiment of the present invention, the relationship may be modified in various manners depending on system settings. The receiver 110 may derive the SESI from the ESI and PSP based on the relationship that SESI=m×ESI+PSP and also acquire the ESI and PSP from the SESI by ESI= [SESI/m] and PSP=SESI−m×[SEI/m]. The receiver 110 may use the acquired values in FEC decoding according to the configuration of the FEC decoder 113.

While it is efficient in terms of overhead to transmit signaling information about the number m of divided regions in an additional packet by the SDP, the signaling information may be added to a source packet or repair packet in another exemplary embodiment of the present invention.

FIG. 6 illustrates signaling information added to a repair packet according to an exemplary embodiment of the present invention.

Referring to FIG. 6, the SBN 404, the ESI 405, the SBL 406, and a Number of Regions (NOR) 407 indicating the number m of divided regions are added to a repair packet.

If FEC decoding is needed, the receiver 110 may determine the size of a source block from the SBL 406 of a repair packet. Additionally, the receiver 110 may decode the source block separately on a region basis because it may determine from the NOR 407 how many regions the source block is divided into.

If the receiver 110 expects that FEC decoding will be needed due to a poor network or channel state, the receiver 110 preferably determines the number of regions in a source block simultaneously with reception of the source block. Accordingly, a NOR may be added to a source packet prior to transmission in exemplary embodiments of the present invention that will be described below.

FIGS. 7 and 8 illustrate signaling information added to a source packet according to exemplary embodiments of the present invention.

Referring to FIGS. 7 and 8, signaling information added to a source packet includes an SBN 701, an ESI 702, a NOR 703, and a PSP 704 as shown in FIG. 7. Alternatively, as shown in FIG. 8, signaling information added to a source packet may include an SBN 801, a NOR 802, and a SESI 803. Other arrangements may also be possible according to exemplary embodiments of the present invention.

As described above, the transmitter 100 adds signaling information indicating the starting region of each source packet in a source block to the source packet and transmits the source block in order to provide information about the configuration of the source block to the receiver 110. The signaling information includes a SESI or a PSP. In addition, a NOR indicating the number of regions divided from the source block may be transmitted, added to a source packet or repair packet or in an additional packet.

The receiver 110 may determine the configuration of the source block by receiving the SBN, SBL, and NOR and thus acquiring the ESI and PSP or acquiring the SESI from the received SBN, SBL, and NOR and thus may perform FEC decoding.

A 3rd Generation Partnership Project Service Aspects 4 Multimedia Broadcast and Multicast Service (3GPP SA4 MBMS) standard uses a Raptor code. A maximum source symbol size available to the Raptor code is 8192. Therefore, if a predetermined number of or more source packets are given, there is a limit on reducing T to decrease the number of padded bytes in constructing a source block.

In this context, when an exemplary embodiment of the present invention is implemented in conformance to the 3GPP SA4 MBMS standard, a source block is constructed by dividing T by m for source packets within the maximum available source symbol size 8192 of the Raptor code. The resulting reduction of the number of padded bytes leads to a decrease in the number of code symbols and improves error correction capability.

For example, if there are 1000 source packets and the length of each source packet is selected randomly between 512 and 1024 bytes, the average length of the source packets is 768 bytes. Thus the total amount of data is about 768000 bytes. If T is set to 128 bytes, the average padding per source packet is 64 bytes and thus the total amount of padding is 64000 bytes. Therefore, the total size of the source block is 832000 bytes. Since T is 128 bytes, the number of source symbols is 6500.

If M=4 according to the present invention, a sub-source symbol size is 32 (=T/4) and 16-byte padding is generated per source packet. Thus the total amount of padding is 16000 bytes and the total size of the source block is 784000 bytes. Since T/4=32, the number of sub-source symbols is 24500 and thus the number of source symbols is 6125. Accordingly, exemplary embodiments of the present invention may reduce the number of source symbols by 375 (=6500−6125), compared to the method according to the related art. The effect may be enhanced if m=8, 16, or the like.

When the transmitter 100 uses Application Layer-FEC (AL-FEC), the transmitter 100 divides given source packets sequentially by a predetermined number. The source block constructer receives the predetermined number of source packets, adds a UDP flow ID and source packet length information to each source packet, and thus constructs a source block including K source symbols according to given T and m values. The FEC encoder 103 generates a predetermined number of repair symbols using the source block. A signaling information generator (not shown) of the transmitter 100 adds an SBN and a SESI to the end of each source packet, or generates a repair packet by connecting one or more repair symbols to each source packet and adds an SBN, an ESI, and an SBL to the start of the repair packet in the manner illustrated in FIG. 4 or FIG. 5. The ESI of the first repair symbol of the repair packet is allocated as the ESI of the repair packet. A UDP header is added to the start of each packet and a source packet and a repair packet are constructed as different UDP packets because they have different ports. FEC signaling information including T and m may be transmitted by the SDP before transmission of the packets.

In the receiver 110, the source block interpreter 112 identifies whether a received packet is a source packet or a repair packet by the port of a UDP header included in the received packet. In the case of a source packet, the receiver 110 acquires an SBN and a SESI from the end of the source packet. In the case of a repair packet, the receiver 110 acquires an SBN, an ESI, and an SBL from the repair packet. Then the receiver 110 reconstructs a source block and repair symbols from received packets based on the preliminarily received T and m values. The FEC decoder 113 decodes each of m sub-source symbols. Alternatively, the FEC decoder 113 may decode each source symbol of size T. In this case, if a sub-source symbol of a source symbol having size T is lost, the source symbol is regarded as lost and then decoded.

A source block may be configured as follows according to another exemplary embodiment of the present invention.

If a specific FEC code is given, the number of source symbols is generally limited. If the maximum available number of code symbols for the given FEC code is Kmax, the source block may determine T irrespective of Kmax, taking into account the FEC coding/decoding complexity of given source packets or the number of padded bytes that may be generated during construction of a source block; generate K source symbols each having symbol size T; and construct m source blocks each having [K/m]+1 or [K/m] source symbols. For example, if there are K source symbols indexed with 0, 1, 2, . . . , (K−1), a first source block includes [K/M] source symbols indexed with 0, m, 2m, 3m, . . . , {([K−1])/m}×m and a second source block includes [K/M] source symbols indexed with 1, m+1, 2m+1, 3m+1, . . . , {([K−1])/m}×m+1. In this manner, m source blocks may be constructed. For the convenience of description, it is assumed that K is a multiple of m.

If m×Kmax=K, a source block with K/m (=Kmax) source symbols may have a smaller amount of padding, compared to the conventional method. While m×T/2-byte padding is generated per source packet in the conventional method, T/2-byte padding is generated in the above method. Therefore, the number of padded bytes is reduced by (m−1)×T/2 bytes on average and thus the number of code symbols is reduced.

In an extended embodiment of the present invention, m source blocks each having K/m source symbols may be combined into one larger source block. In this case, a symbol size is m×T and the SBN illustrated in FIGS. 4 to 8 identifies the larger source block.

Figure 9:
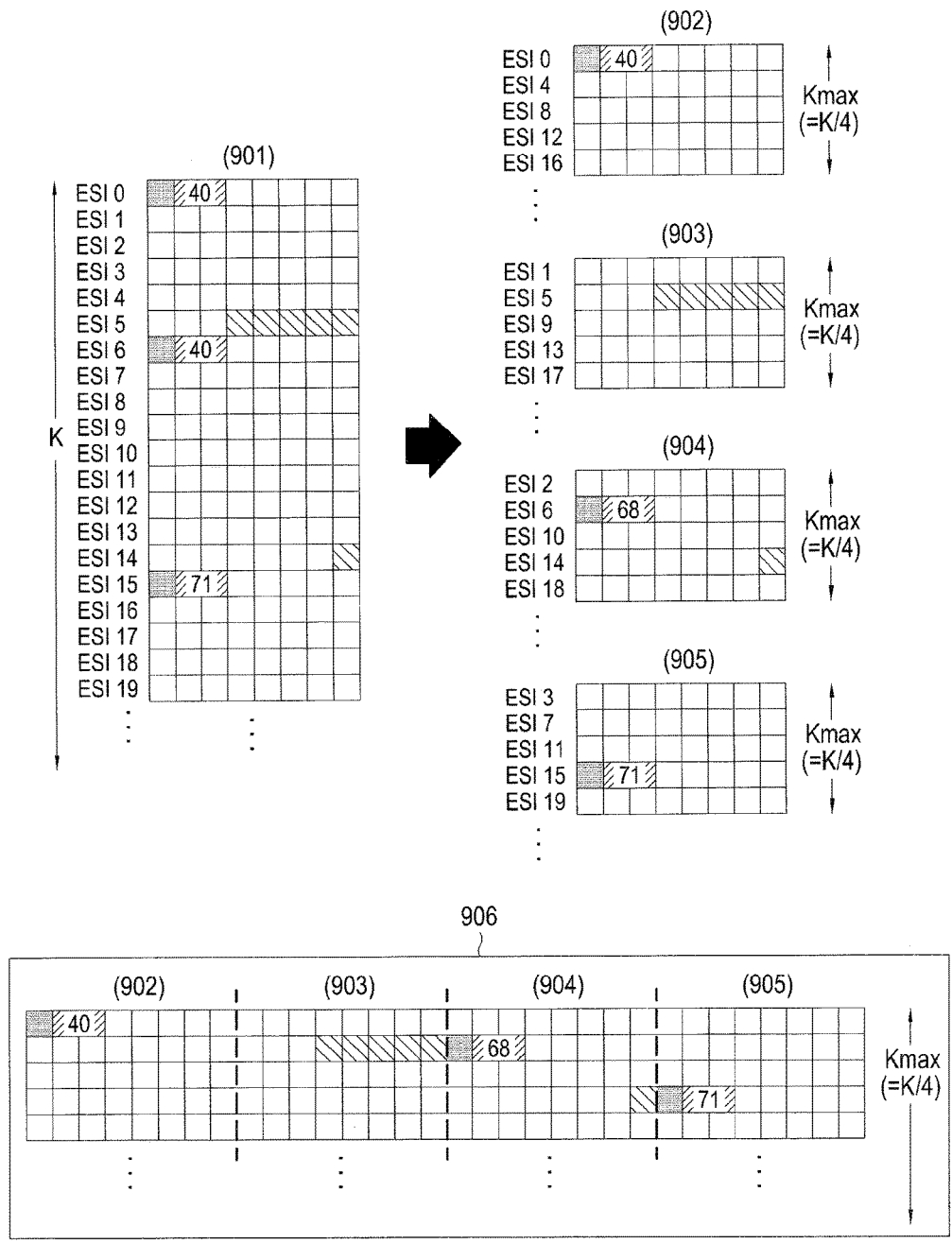
FIG. 9 illustrates a configuration of a source block according to an exemplary embodiment of the present invention.

To help understanding, a simple example with m=4 is illustrated in FIG. 9.

FIG. 9 illustrates a configuration of a source block according to an exemplary embodiment of the present invention.

Referring to FIG. 9, after generating K source symbols 901, the source block constructer constructs a first source block 902 with K/4 source symbols indexed with 0, 4, 8, 12, . . . , (K−4), a second source block 903 with K/4 source symbols indexed with 1, 5, 9, 13, . . . , (K−3), a third source block 904 with K/4 source symbols indexed with 2, 6, 10, 14, . . . , (K−2), and a fourth source block 905 with K/4 source symbols indexed with 3, 7, 11, 15, . . . , (K−1).

The transmitter 100 or the receiver 110 may perform FEC encoding or decoding on the source blocks 902 to 905 separately or may combine the source blocks 902 to 905 into one source block 906 and perform FEC encoding or decoding on the source block 906. If the size of each source symbol 901 is T, the symbol size of the combined source block 906 is 4 T. It is to be noted that the combined source block 906 has the source block configuration illustrated in FIG. 3A.

The source block illustrated in FIG. 9 may be subjected to FEC encoding and decoding and signaling in a similar manner as the source blocks illustrated in FIGS. 3A, 3B and 4.

According to another exemplary embodiment of the present invention, information about the symbol size T and the number m of divided regions is transmitted in an additional packet or path. To help understanding, FEC Object Transmission Information (OTI) carrying the symbol size T by the SDP in 3GPP TS 26.346 will be described below.

The FEC OTI specifies a maximum source block length in symbols and a symbol size in bytes. The symbol size and the maximum source block length may be encoded to a 4-octet field. The source block length is signaled by a Repair FEC Payload ID of a specific packet that does not exceed a maximum source block length indicated by FEC OTI for a specific stream. The FEC OTI is transmitted by the SDP. The Repair FEC payload ID is signaling information added to a repair packet to indicate a source block configuration.

To indicate the number m of divided regions in a source block or the number m of sub-symbols in one code symbol, signaling information of a predetermined size may be added to the FEC OTI. The transmitter 100 may further include a signaling information generator (not shown) for FEC OTI transmission and the receiver 110 may further include a signaling information receiver (not shown) for FEC OTI reception. The signaling information generator constructs FEC OTI with the same signaling information as used in the source block constructer 102 in a predetermined format and transmits the FEC OTI to the receiver 110 by a predetermined transmission protocol, for example, by the SDP. The signaling information receiver extracts the signaling information from the FEC OTI received from the transmitter 100 and provides the extracted signaling information to the source block interpreter 112.

FIGS. 10A and 10B illustrate FEC OTI according to exemplary embodiments of the present invention.

Referring to FIG. 10A, a Number of Sub-Symbols (NSS) 1002 indicating the number m of sub-symbols in one code symbol is included together with a symbol size (T) 1001 and a maximum source block length 1003 in FEC OTI. The symbol size (T) 1001 indicates the length of a code symbol in bytes and may be defined as the length of a source symbol or repair symbol. The NSS 1002 indicates the number of sub-symbols per source symbol or the number of symbol elements included in one source symbol.

FIG. 10B illustrates the configuration of FEC OTI in which the NSS 1002 of FIG. 10A is replaced with an NOR 1004 according to an exemplary embodiment of the present invention.

Referring to FIG. 10B, the NSS 1002 indicates the number of sub-symbols in one symbol, whereas the NOR 1004 indicates the number of divided regions in a source block. However, the NSS 1002 and the NOR 1004 may have the same value with the same function.

The NSS 1002 or the NOR 1004 may have a variable length without any special limitations depending on system requirements. According to an exemplary embodiment of the present invention, the NSS 1002 or the NOR 1004 may have 1 or 2 bytes. In FIGS. 10A and 10B, the maximum source block length 1003 may or may not be transmitted according to a system.

A description will be given of an exemplary embodiment of determining the size of each sub-symbol according to the relationship between the symbol size T and m corresponding to the NSS or NOR.

If the quotient and remainder of dividing T by m are a and b, respectively (i.e., if the relationship that $T=m \times a+b$, $0 \leq b < m$ is established), each of the first sub-symbols has size (a+1) and each of the remaining (m−b) sub-symbols has size a. The order of the sub-symbols of size (a+1) and the sub-symbols of size a may be reversed. If T is a multiple of m, each sub-symbol has size a.

Another exemplary embodiment of determining the size of each sub-symbol according to the relationship between the symbol size T and m corresponding to the NSS or NOR described below.

If the quotient and remainder of dividing T by m are a and b, respectively, that is, if the relationship that is $T=m \times a+b$, $0 \leq b < m$ is established, the first sub-symbol has size (a+1) and each of the remaining (m−1) sub-symbols has size a. The order of the sub-symbol of size (a+b) and the sub-symbols of size a may be reversed.

As described above, the size of each sub-symbol may be set in various manners. In addition, the size of each sub-symbol may be expressed as the number of columns in a region corresponding to the sub-symbol.

In the case where a source block is constructed and FEC-encoded in order to allow the receiver 110 to recover a lost packet in a broadcasting or communication system, examples of a set (or suite) of signaling information (i.e., source packet additional information) added to a source packet, namely a source FEC Payload ID, signaling information (i.e., recovery packet additional information) added to a repair packet (i.e., a repair FEC Payload ID), and FEC OTI to indicate a source block configuration is described below with reference to FIGS. 11 and 12.

FIG. 11 illustrates a set of signaling information according to an exemplary embodiment of the present invention.

Referring to FIG. 11, if a part of transmitted source packets are lost and thus require FEC decoding, the receiver 110 acquires the symbol size (T) 1001 and the NSS (m) 1002 from FEC OTI, the SBN 501 and the SESI 502 from source packet additional information, and the SBL 406 from repair packet additional information, determines a source block configuration, and reconstructs a source block by appropriately arranging received source packets during decoding using one or more repair packets. Since the SESI 502 of each source packet indicates the starting sub-symbol of the source packet, the receiver 110 may determine the layout of each source packet accurately. The position of a lost source packet is processed as erasure.

The receiver 110 performs FEC decoding based on a mapping relationship between a source block and repair packets according to the SBN 501 acquired from the source packet additional information and the SBN 404 and the ESI 405 acquired from the repair packet additional information. The FEC decoder 113 acquires the NSS (i.e., m) from the FEC OTI, divides the source block into m regions, and decodes the individual m regions. According to another exemplary embodiment of the present invention, the FEC decoder 113 may perform FEC decoding by treating the source block as one region of symbol size T without dividing the source block into m regions. In the latter case, all rows including a lost source packet and its additional information are processed as erasure.

FIG. 12 illustrates a set of signaling information according to an exemplary embodiment of the present invention.

Referring to FIG. 12, the signaling information set includes source packet additional information, repair packet additional information, and FEC OTI.

Unlike FIG. 11, FEC OTI is constructed as illustrated in FIG. 10B. The source packet additional information signals the ESI 405 and the PSP 406 separately instead of the SESI 502.

If a part of transmitted source packets are lost and thus require FEC decoding, the receiver 110 acquires the symbol size (T) 1001 and the NSS (m) 1004 from FEC OTI; the SBN 401, the ESI 402, and the PSP 403 from source packet additional information; and the SBL 406 from repair packet additional information. The receiver 110 determines a source block configuration, and reconstructs a source block by appropriately arranging received source packets during decoding using one or more repair packets. Since the ESI 402 of each source packet indicates the starting row or source symbol of the source packet and the PSP 403 of each source packet indicates the starting region of the source packet, the receiver 110 may determine the layout of each source packet accurately in a source block. The position of a lost source packet is processed as erasure.

The receiver 110 performs FEC decoding based on a mapping relationship between a source block and repair packets according to the SBN 401 acquired from the source packet additional information and the SBN 404 and the ESI 405 acquired from the repair packet additional information. The FEC decoder 113 acquires the NOR 1004 (i.e., m) from the FEC OTI, separates the source block into m regions, and decodes the individual m regions. According to another exemplary embodiment, the FEC decoder 113 may perform FEC decoding by treating the source block as one region of symbol size T without dividing the source block into m regions. In the latter case, all rows including a lost source packet and its additional information are processed as erasure.

The sets of signaling information illustrated in FIGS. 11 and 12 include all information needed for the receiver 110 to recover a lost source packet. The maximum source block length 1003 may or may not be transmitted in FIGS. 11 and 12 depending on a system situation.

FIGS. 13A and 13B illustrate FEC OTI according to exemplary embodiments of the present invention.

Referring to FIGS. 13A and 13B, a sub-symbol size (Tsub) 1301 is included instead of a symbol size T in FEC OTI, compared to FIGS. 10A and 10B. Since the relationship that T/m=Tsub is established among the symbol size T, the sub-symbol size Tsub, and m indicated by the NSS 1002 or the NOR 1004, the other parameters may be determined based on two of the three values. For example, since the transmitter 100 transmits Tsub and m in FIGS. 13A and 13B, the receiver 110 receives Tsub and m, calculates a symbol size by T=m×Tsub, and reconstructs a source block based on the symbol size. Like the afore-described exemplary embodiments, the maximum source block size 1003 may not be transmitted.

An operation of calculating the size of a source block (i.e. the total amount of data in a source block) based on the relationship between the source block and source packets is described below, based on the following definitions:

n: the number of UDP packets in the source block. It is variable in constructing the source block.

R(i): the octets of the UDP payload of an ith UDP packet inserted in the source block.

l(i): the length of R(I) in octets.

L(i): two octets indicating the value of l(i).

f(i): an integer indicating the UDP flow ID of the ith UDP packet.

F(i): one octet indicating the value of f(i).

T: a source symbol size in bytes.

m: the number of sub-symbols in a source symbol (or a code symbol). If T/m=T', T' is the length of a sub-symbol.

s(i): the smallest integer satisfying $s(i) \times T/m = s(i) \times T' >= (l(i)+3)$.

P(i): $s(i) \times T' - (l(i)+3)$ zero octets. P(i) is a padding octet that aligns the start of each UDP packet with the start of a sub-symbol.

If the sum of s(i)×T' values for i=1, 2, . . . , n is S, then K (=ceil(S/T)) is the length of the source block and SSB (=T*ceil(S/T)) is the size of the source block. For a real number x, ceil(x) represents the smallest integer equal to or larger than x.

It may be concluded that a source block is constructed by concatenating F(i), L(i), R(i) and P(i) values to the SSB (=T×ceil(S/T)) value for i=1, 2, . . . , n. Herein, S is the sum of s(i)×T' values for i=1, 2, . . . , n.

Certain aspects of the present invention can also be embodied as computer readable code on a non-transitory computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting data in a broadcasting system, the method comprising:

generating a source symbol block including source symbols, each source symbol partitioned into an equal number of symbol elements, and each symbol element having multiple and an equal number of bytes;

placing a first source packet into a plurality of first symbol elements of the source symbol block, and placing a second source packet following the first source packet into one or more second symbol elements-following the plurality of first symbol elements;

encoding the source symbols of the source symbol block comprising the first and the second source packets; and transmitting information indicating a number of symbol elements in each of the source symbols, wherein at least a portion of the first source packet and at least a portion of the second source packet are placed into a same source symbol of the source symbol block and at least one byte of a last symbol element of the plurality of first symbol elements is padded before the one or more second symbol elements, based on the last symbol element of the first symbol elements not being a last symbol element of the same source symbol and data of the first source packet not filling the plurality of first symbol elements.

2. The method of claim 1, further comprising:

padding a region between the last symbol element of the first symbol elements and the first symbol element of the second symbol elements.

* * * * *